J. JONES.
Peat Machine.
No. 69,677. Patented Oct. 8, 1867.
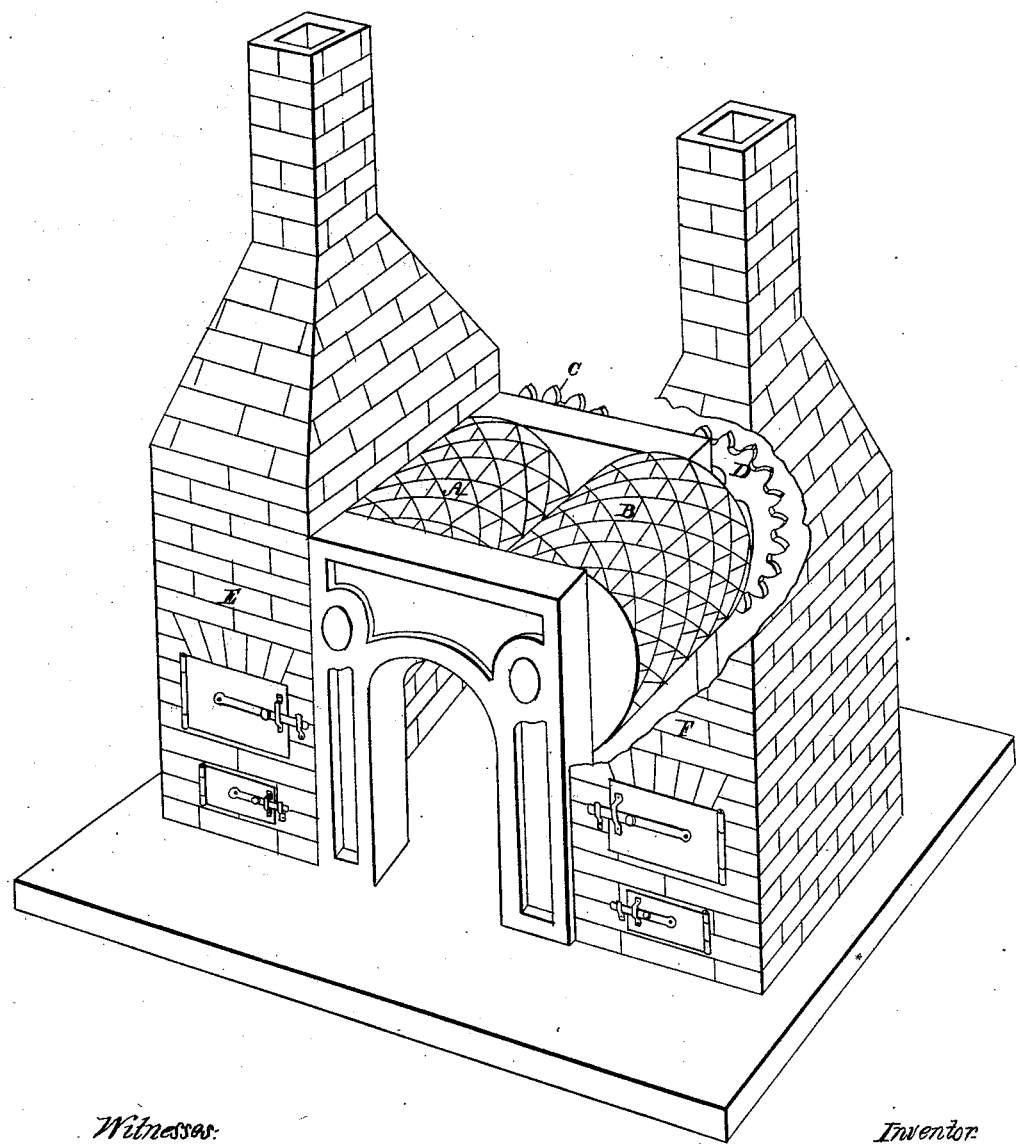
Witnesses:
James A. Thomson
Wm H. Imbos
Inventor:
John Jones

United States Patent Office.

JOHN JONES, OF BALTIMORE, MARYLAND.

Letters Patent No. 69,677, dated October 8, 1867.

---

IMPROVED MACHINE FOR COMPRESSING PEAT.

---

The Schedule referred to in these Letters Patent and making part of the same.

---

TO ALL WHOM IT MAY CONCERN:

Be it known that I, JOHN JONES, of the city of Baltimore, and State of Maryland, have invented a new and useful Machine for Compressing Peat; and I do hereby declare that the following is a full, clear, and exact description of the construction and operation of the same, reference being had to the annexed perspective drawing, making a part of this specification.

The rollers A B are mounted like an ordinary pair of horizontal rollers, and are driven together by a pair of spur-wheels, C D. The rollers are filled with pits, so arranged that the diamond-shaped edges coming together form square blocks of the material pressed between them, or if grooved or corrugated rollers are used, the edges are brought together so as to give any required shape at the time of compressing. The furnaces E F are so constructed that the fire within gives its heat to the direct surface of the rollers A B, as a portion of each roller revolves within its respective furnace. The peat is fed between the hot rollers, where it is pressed, shaped, and calendered.

I claim the application of pitted, grooved, or corrugated rollers, for the purpose specified.

I also claim the direct application of heat to the pressing apparatus.

JOHN JONES.

Witnesses:
JAMES A. THOMSON,
WM. H. INSLEE.